United States Patent [19]
Yoshida et al.

[11] Patent Number: 5,825,370
[45] Date of Patent: Oct. 20, 1998

[54] METHOD AND APPARATUS FOR PROCESSING CHARACTERS

[75] Inventors: Toshikuni Yoshida; Shinichiro Motokado; Tomoko Motokado, all of Kawasaki; Mutsumi Ohtomo, Sapporo, all of Japan; Antonius Hellmann, Munich, Germany

[73] Assignee: Fujitsu Limited, Kawasaki, Japan

[21] Appl. No.: 748,012

[22] Filed: Nov. 12, 1996

[30] Foreign Application Priority Data

Nov. 9, 1995 [JP] Japan ................................. 7-290697

[51] Int. Cl.⁶ .................................................. G06F 15/00
[52] U.S. Cl. ............................................................ 345/472
[58] Field of Search .................................. 345/468, 469, 345/470, 471, 472

[56] References Cited

U.S. PATENT DOCUMENTS 5,222,208  6/1993  Matsuhira ........................ 395/150
5,295,240  3/1994  Kasimoto ......................... 395/151

FOREIGN PATENT DOCUMENTS 5-046143  2/1993  Japan .

*Primary Examiner*—Phu K. Nguyen
*Attorney, Agent, or Firm*—Staas & Halsey

[57] ABSTRACT

In an output apparatus capable of outputting characters in a visible state, one character is first formed by combining a plurality of parts and the formed character is then output in a designated size. At this time, positions of at least two points which are the basis of the positioning of each part are determined and then an outline of the character is determined. Thus, when outputting a character in an arbitrarily enlarged or reduced size in the output apparatus, it is possible to keep a shape or balance of the character very good and thus to contribute to a high quality character output.

27 Claims, 21 Drawing Sheets

Fig.8a

| ARRANGEMENT ORIGIN OF EACH PART (ORIGINAL VALUE) | | |
|---|---|---|
| PARTS | X | Y |
| a | 2.4 | 2.0 |
| b | 2.4 | 5.3 |
| c | 2.4 | 8.3 |
| d | 1.2 | 0.9 |
| e | 9.4 | 0.9 |

Fig.8b

| ARRANGEMENT ORIGIN OF EACH PART (AFTER ROUNDED) | | |
|---|---|---|
| PARTS | X | Y |
| a | 2 | 2 |
| b | 2 | 5 |
| c | 2 | 8 |
| d | 1 | 1 |
| e | 9 | 1 |

| PARTS | Sx | Mx | Ex |
|---|---|---|---|
| MASTER COORDINATES | 123 | 258 | 793 |
| AFTER REDUCED | 1.48 | 2.81 | 9.52 |
| TARGET COORDINATES | 1 | | 10 |

| OUTLINE POINTS | P0 | P1 | P2 |
|---|---|---|---|
| MASTER COORDINATES | 164 | 396 | 702 |
| AFTER REDUCED | 2.2 | 5.3 | 9.4 |
| TARGET COORDINATES | 2 | | 9 |

| PARTS NUMBER | MASTER COORDINATES | | E/R RATE | | AFTER E/R PROCESSING | | AFTER HINT PROCESSING | |
|---|---|---|---|---|---|---|---|---|
| | X | Y | X | Y | X | Y | X | Y |
| 1 | 56 | 493 | 0.012 | 0.012 | 0.672 | 5.916 | 1 | 6 |
| 2 | 111 | 493 | 0.011 | 0.012 | 1.605 | 6 | 1.605 | 6 |
| 3 | 953 | 493 | 0.012 | 0.012 | 11.436 | 5.916 | 11 | 6 |

Fig.16

| OUTLINE POINT NUMBER | MASTER COORDINATES | | HINT INFORMATION | | E/R RATE | | AFTER E/R PROCESSING | | AFTER HINT PROCESSING | |
|---|---|---|---|---|---|---|---|---|---|---|
| | X | Y | X | Y | X | Y | X | Y | X | Y |
| 1 | -92 | 103 | | PRESENT | 0.011 | 0.011 | -1.012 | 1.133 | | 2 |
| 2 | -182 | 0 | PRESENT | | 0.011 | 0.019 | -2.002 | 0 | -2 | |
| 3 | 0 | 0 | PRESENT | PRESENT | 0.011 | 0.011 | 0 | 0 | 0 | 0 |
| 4 | 0 | 21 | PRESENT | | 0.011 | 0.019 | 0 | 0.399 | 0 | |
| 5 | -92 | 103 | | PRESENT | 0.011 | 0.011 | -1.012 | 1.133 | | 2 |

Fig.18

| | |
|---|---|
| x | 1,3,4,2,6,5 |
| y | 2,6,5,1,4,3 |
| 1 | sy2,ey6 |
| 2 | sx1,ex3 |
| 3 | sx1,ex3 |
| 4 | sy2,ey6 |
| 5 | sx1,ex3 |
| 6 | sx1,ex3 |

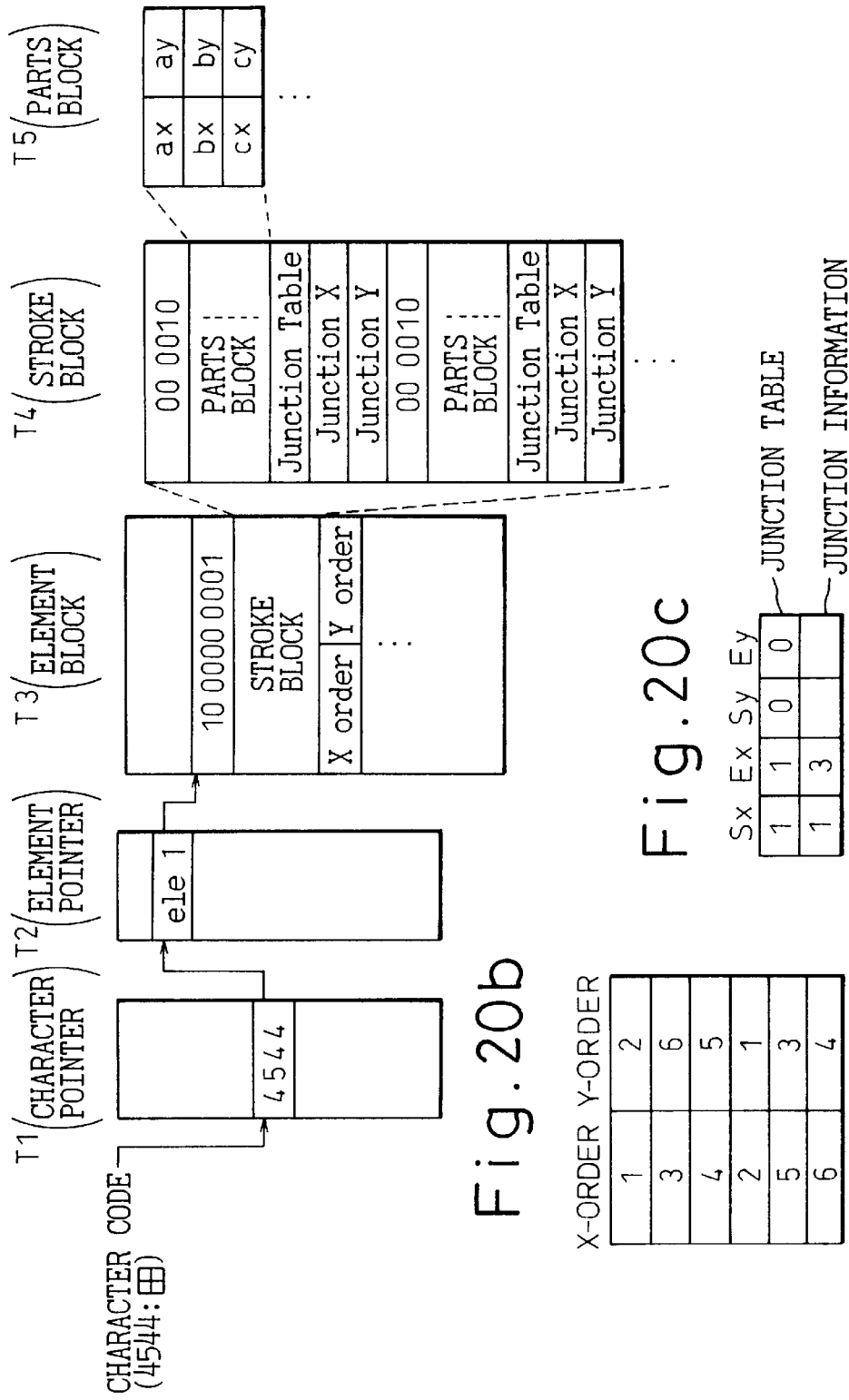

| X-ASSEMBLY ORDER | JUNCTION INFORMATION |
|---|---|
| 1,3,4,2,6,5 | 1: Sy-2, Ey-6 |
| Y-ASSEMBLY ORDER | 2: Sx-1, Ex-3 |
| 2,6,5,1,3,4 | 3: Sy-2, Ey-6 |
| | 4: Sy-2, Ey-6 |
| | 5: Sx-1, Ex-3 |
| | 6: Sx-1, Ex-3 |

Fig. 22

| | Sx / Ex | Sy / Ey | JSx / JEx | JSy / JEy | Sy*s / Ex*s | Sy*s / Ey*4 | r(Sx*s) / r(Ex*s) | r(Sy*s) / r(Ey*s) | ax / ax | ay / ay | Sx*s+ax / Sy*s+ax | Ex*s+ay / Ey*s+ay | r(Sx*s+a) / r(Sy*s+a) | r(Ex*s+a) / r(Ey*s+a) | Sx' / Ex' | Sy' / Ey' |
|---|---|---|---|---|---|---|---|---|---|---|---|---|---|---|---|---|
| 1 | 220 / 220 | 710 / 210 | – / – | 2 / 6 | 8.8 / 8.8 | 28.4 / 8.4 | 9 / 9 | – / – | 0.2 / 0.2 | – / – | – / – | 28.0 / 8.0 | – / – | 28 / 8 | 9 / 9 | 28 / 8 |
| 2 | 260 / 720 | 710 / 710 | 1 / 3 | – / – | 10.4 / 28.8 | 28.4 / 28.4 | – / – | 28 / 28 | – / – | 0.4 / 0.4 | 10.6 / 29.0 | – / – | 11 / 29 | – / – | 11 / 29 | 29 / 29 |
| 3 | 770 / 770 | 710 / 210 | – / – | 2 / 6 | 30.8 / 30.8 | 28.4 / 8.4 | 31 / 31 | – / – | 0.2 / 0.2 | – / – | – / – | 28.0 / 8.0 | – / – | 28 / 8 | 31 / 31 | 28 / 8 |
| 4 | 470 / 470 | 710 / 210 | – / – | 2 / 6 | 18.8 / 18.8 | 28.4 / 8.4 | 19 / 19 | – / – | – / – | – / – | – / – | 28.0 / 8.0 | – / – | 28 / 8 | 19 / 19 | 28 / 8 |
| 5 | 260 / 770 | 480 / 480 | 1 / 3 | – / – | 10.4 / 30.8 | 19.2 / 19.2 | – / – | 19 / 19 | – / – | 0.2 / 0.2 | 10.6 / 31.0 | – / – | 11 / 31 | – / – | 11 / 31 | 19 / 19 |
| 6 | 260 / 770 | 280 / 280 | 1 / 3 | – / – | 10.4 / 30.8 | 11.2 / 11.2 | – / – | 11 / 11 | – / – | 0.2 / 0.2 | 10.6 / 31.0 | – / – | 11 / 31 | – / – | 11 / 31 | 11 / 11 |

METHOD AND APPARATUS FOR PROCESSING CHARACTERS

BACKGROUND OF THE INVENTION

1. Field of the Invention

The present invention relates to an output apparatus capable of outputting characters in a visible state. More particularly, it relates to a technique of improving the quality of an output character when outputting the character in an arbitrarily enlarged or reduced size in the output apparatus.

2. Description of the Related Art

In recent years, an output apparatus such as a display or a printer has been required to realize that an operator can arbitrarily designate the size of an output character. As an example of the technique of outputting a character with an arbitrary size, for example, an outline method is known. This outline method includes storing coordinate information concerning positions of each part constituting a character in a memory, computing the positions of each part according to a designated size and the coordinate information stored in the memory, and determining outlines of each part.

An example of the technique of determining positions of each part is disclosed in, for example, U.S. Pat. No. 4,675,830. This known example is directed to processing only English characters and numerals in which "hen" (i.e., left element), "tsukuri" (i.e., right element), and the like, are not present. Accordingly, as to characters in which "hen", "tsukuri", and the like, are present, for example, "Kanji" (i.e., Chinese characters) having a large number of strokes, the above known example cannot realize creation of characters with high quality.

As to the above outline method, various kinds of techniques of storing font data have been developed to reduce data volume and to improve output quality. One example is disclosed in, for example, Japanese unexamined Patent Publication (Kokai) No. 61-147288. This known example teaches classifying parts constituting each character, storing the classified parts in a memory or the like, and combining some of the classified parts stored in the memory, to thereby constitute one character.

As described above, since the known technique includes effecting computation with respect to basic character patterns and determining positions of each part constituting a character, a drawback occurs in that, depending on the location of a plurality of minimal elements which can be physically output, the positions of each part are deviated from their original positions. As a result, a problem occurs in that a shape or balance of an output character becomes bad and thus the quality of the character output is deteriorated.

SUMMARY OF THE INVENTION

An object of the present invention is to provide a character processing technique by which, when outputting a character in an arbitrarily enlarged or reduced size in an output apparatus, it is possible to keep a shape or balance of the character very good and thus to contribute to a high quality character output.

According to the present invention, individual parts constituting one character are stored in a memory (storing means) for each character or for font. Also, a plurality of parts constitute one stroke. The positioning of parts constituting one stroke is carried out by determining two points among the points at which the parts are located in the stroke, according to a designated size of the character. Namely, positions (arrangement points) of each part are determined based on the determined positions of the two points. Thus, from the arrangement points, it is possible to determine an outline of the character, the length and position of each stroke, or the like. As a result, it is possible to output the character with its shape or balance being kept very good.

Also, when forming respective strokes constituting one character, each position of the strokes is determined based on sizes or thicknesses of basic parts, and thus it is possible to provide the character with a good balance with keeping the balance of each part very good.

Also, by storing information concerning the connection relationship between one stroke and other strokes and suitably using the information when outputting the character, it is possible to carry out the positioning of two or more strokes which are connected to each other, with a good balance. This contributes to a high quality character output.

Also, by providing a storage media storing a program for implementing the above character processing method, it is possible to install the method and apparatus of the present invention in apparatuses which are at work, for example, personal computers, word processors, printers, or the like. Furthermore, it is possible to sell, assign or lease the apparatuses in which the present invention is installed, to users of the apparatuses.

BRIEF DESCRIPTION OF THE DRAWINGS

Other objects and features of the present invention will be described hereinafter in detail by way of preferred embodiments with reference to the accompanying drawings, in which:

FIGS. 8a and 8b are diagrams showing the relationship between the arrangement origins of each part computed according to the E/R rate and the arrangement origins after the rounding processing is carried out;

FIG. 16 is a diagram showing the data structure of the outline information;

FIG. 18 is a diagram showing an example of the common file;

FIGS. 20a to 20c are diagrams showing the constitution of the memory for storing common file;

FIG. 22 is a diagram showing a concrete example of the common file;

DESCRIPTION OF THE PREFERRED EMBODIMENTS

Figure 1:
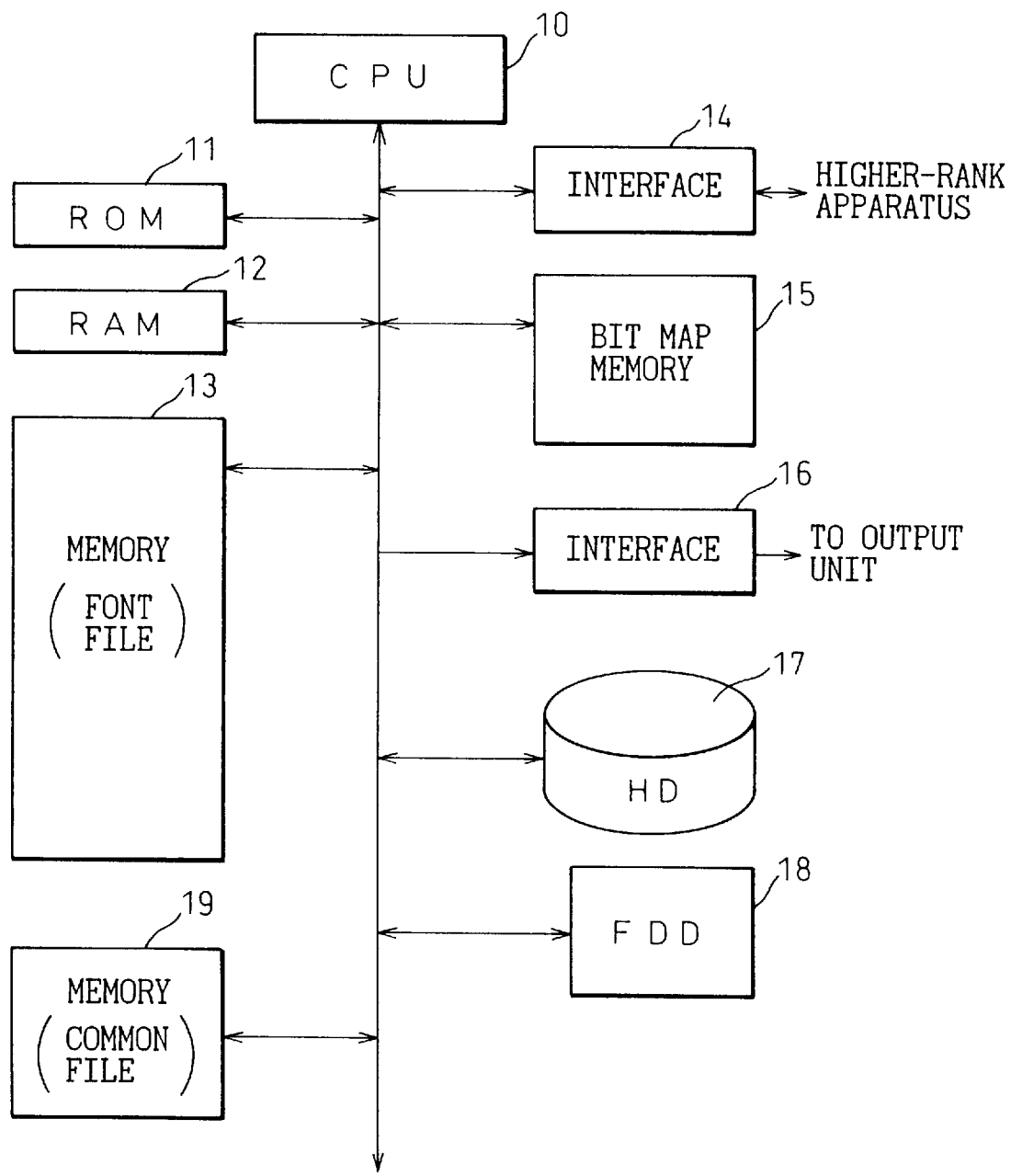
FIG. 1 is a diagram showing the constitution of the character processing apparatus according to an embodiment of the present invention.

FIG. 1 illustrates the constitution of the character processing apparatus according to an embodiment of the present invention. Prior to explaining the present embodiment, the background of the invention will be first explained.

Among output apparatuses, there are printing apparatuses such as an impact printer or a non-impact printer, or display apparatuses such as a CRT display or a liquid-crystal display. Such an output apparatus is adapted to output characters in a size arbitrarily designated by an operator, using a higher-rank apparatus (e.g., personal computer, word processor, or the like) connected to the output apparatus.

Also, such an output apparatus possesses a character font for outputting characters, which is referred to as "original character". This original character has an originally designed good balance with respect to positions and lengths of each part.

The original character is expressed on the coordinates, for example, having ordinate of 1000 and abscissa of 1000. One graduation of the coordinates normally corresponds to the minimal element (one dot) which can be output by the output apparatus. Accordingly, where the original character is output without being processed by the output apparatus, it is output with 1000×1000 dots. For example, where a CRT display of 17 inches is used as the output apparatus, it is impossible to display a plurality of characters at a time on the screen of the CRT display, because the screen size is 1280×1024 dots. To cope with this, the original character is normally reduced and output. Furthermore, the character is output in a size designated by an operator, if necessary.

Also, in such an output apparatus, it is undesirable to store character information of all of the sizes which can be output, in a memory, because the memory capacity becomes large. To cope with this, only the character information of a size of the original character is stored in the memory and the original character is output in a designated (i.e., enlarged or reduced) size.

On the other hand, in apparatuses for outputting such characters, restrictions are placed on the positions of each dot constituting one character. Namely, the positions of each dot are determined beforehand for respective apparatuses and thus cannot be moved. For example, in an electrophotographic printer which uses laser beam to form a latent image on a photosensitive drum, restrictions are placed on a diameter of the laser beam. Also, in a wire dot printer which uses wires to carry out a printing on a printed form, restrictions are placed on a diameter of each wire. Also, in a CRT display which irradiates laser beam from its rear portion to cause its screen to emit light, restrictions are placed on respective dots of the screen.

Accordingly, when enlargement/reduction (E/R) processing is carried out by such an output apparatus and each part of the original character is computed according to a designated E/R rate, there is a possibility in that the range within which dots for forming one character must be output may contain a range where some dots cannot be physically output. In this case, it is necessary to compensate the range within which dots for forming one character must be output, i.e., to move the range to a position at which all of the dots can be physically output.

However, where the E/R processing is carried out with respect to the original character, respective parts of the original character are individually compensated and thus a drawback occurs in that the positions of each part are deviated from their original positions.

Figure 2:
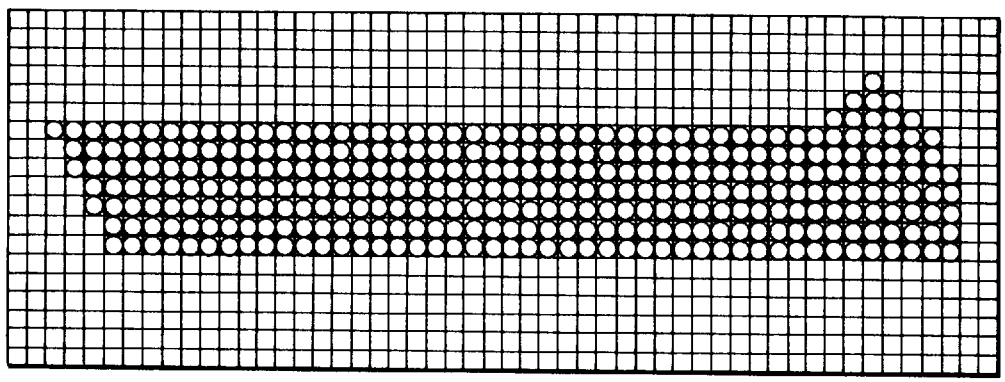
FIG. 2 is a diagram showing the relationship between one character and dots.

One example is shown in FIG. 2, where Chinese character "一" is output in the size of its original character and with Ming-style. For simplifying the explanation, the number of dots is made small. In FIG. 2, the inside of one square surrounded by adjacent ruled lines is a position at which one dot can be physically output. Also, intersections of each ruled line are referred to as grid coordinates. Where an E/R processing is carried out with respect to a character, positions of each part of the character are computed according to a designated E/R rate and the computed positions are compensated on the grid coordinates. Then, by outputting respective dots in the corresponding squares within the compensated outline of the character on the grid coordinates, it is possible to output the character in a visible state. For example, in a printing apparatus, a visible image is formed on a printed form by adhering ink or toner to the positions of dots. Also, in a display, a visible image is formed on its screen by bringing the positions of dots to a light-emitted state.

Figure 3:
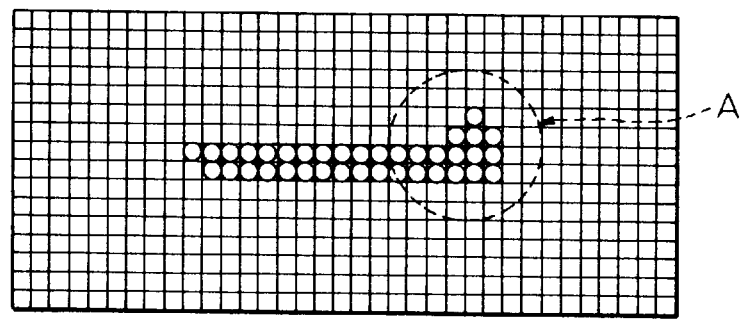
FIG. 3 is a diagram showing the relationship between one character and dots in the case where the character is reduced.

When Chinese character "一" is reduced and output, character data is first read from a memory where the original character is stored; a reduction processing is carried out with respect to the character data according to a designated reduction rate; and the reduced data is developed on a bit map memory to thereby be output. The output result is as shown in FIG. 3.

Next, the processing of outputting characters will be explained with reference to FIG. 1.

Reference 10 denotes a central processing unit (CPU) which controls the character processing; reference 11 a read-only memory (ROM); reference 12 a random access memory (RAM); and reference 13 a memory for storing font file. This memory 13 stores character information, i.e., data concerning a coordinate position which is the basis of each character, and data concerning coordinate positions of parts constituting the character. The storage area of the memory 13 is desirably sectioned into some areas for each font of the character. By the sectioning, it is possible to easily add or delete fonts. Also, reference 14 denotes an interface for communication of data with a higher-rank apparatus; reference 15 a bit map memory for developing character pattern information for an output unit such as a printer or a display; reference 16 an interface connected to the output unit; and reference 17 a hard disk (HD) in which data and programs necessary for the operation of the CPU 10 are stored. Also, reference 18 denotes a flexible disk drive (FDD), which is used when software is installed therein, or when reading or writing of data is carried out thereto. Also, reference 19 denotes a memory for storing common file. This memory 19 stores information for supplementing the character information stored in the memory 13, e.g., junction information of parts constituting each character, priority information for use in carrying out the positioning of each part, and the like. These information are commonly provided for respective fonts.

The above functional blocks are directly connected to each other via a common bus, or indirectly connected to each other via a CPU bus or an external bus, and are further connected to the CPU 10.

In the above constitution, data to be output as a character is first received from the higher-rank apparatus to the CPU 10, which stores the received data in the RAM 12. Then, character information corresponding to the data stored in the RAM 12 is read from the memory 13 and the read information is developed in the bit map memory 15. The bit map memory 15 develops the character information so as to designate the output of dots at the positions which are to be brought to a visible state in the output unit. Accordingly, when the character data is stored in the bit map memory 15, the size and position of the character are determined. The data written in the bit map memory 15 is transmitted via the interface 16 to the output unit, which carries out character output based on the data. The character output is carried out as shown in FIG. 2.

Where the data received from the higher-rank apparatus contains information concerning an E/R rate, the CPU 10 executes an E/R processing according to the E/R rate with respect to the original character read from the memory 13. The E/R processed data is then stored in the bit map memory 15.

However, the positions of respective dots are not determined by only the designated E/R rate. The reason will be explained with reference to FIG. 4, which shows an enlargement of the portion of "A" of FIG. 3.

Positions on the coordinates at which respective parts constituting one character are to be located are computed based on the character information read from the memory 13 and the designated E/R rate. Then, an outline of the character is computed based on the computed positions of the parts. If the computed outline contains dots which cannot be physically output, it is necessary to carry out a compensation so that the character can be output with dots which can be physically output. Such a compensation is hereinafter referred to as a "rounding processing".

Figure 4:
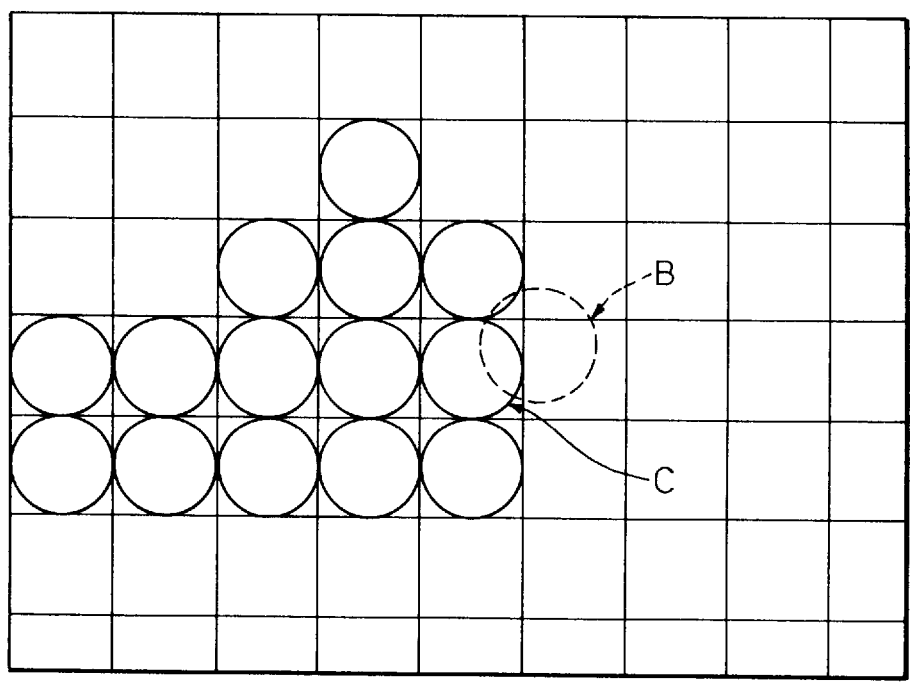
FIG. 4 is an enlarged diagram of FIG. 3.

Namely, as a result of computing the positions of each part based on the character information and the designated E/R rate, where the dots constituting one part contains a dot expressed by a broken line indicated by "B" in FIG. 4, it is impossible to physically output the dot at this position. To cope with this, it is necessary to carry out a rounding processing for moving the dot of "B" to a position at which the dot can be physically output, e.g., to the position of a dot expressed by a solid line indicated by "C" in FIG. 4.

If the ranges in which the respective dots constituting one part are output are moved by such a rounding processing all in the same direction and by the same quantity, it would be possible to keep a shape or balance of the character to a certain extent. However, since the direction of the rounding processing for one part is different from that for another part, it is not always possible to keep a balance of the original character very good.

Also, in recent years, in order to reduce the capacity of a memory for storing font data, each character is divided into elements such as "hen", "tsukuri", or the like, and each element is divided into strokes. Also, each stroke is divided into a plurality of parts. For example, one example is disclosed in J.P.P.(Kokai) No. 5-46143, in which one stroke in a character of Ming-style is divided into a start part, a middle part and an end part, and these parts are independently stored. Where an E/R processing of a character is carried out using such a storing technique, it is necessary to execute computatons for respective parts according to a designated E/R rate. As a result, the positions of each part are deviated from their original positions and thus the balance of the entire character is damaged.

To cope with this, as to the dots whch are among dots constituting one character and are important to keep the quality of character output good, it is first necessary to carry out an E/R processing and a rounding processing and to position the dots to the respective positions at which they can be physically output. It is then necessary to compute other dots according to a high priority order and to carry out an E/R processing of the computed dots according to a designated E/R rate.

Figure 5:
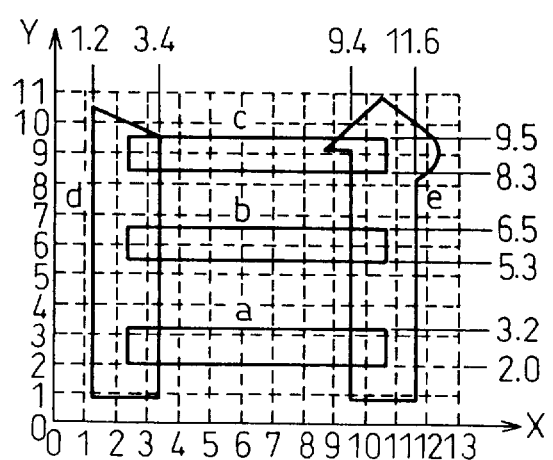
FIG. 5 is a diagram showing a result obtained by computing the character according to the enlargement/reduction (E/R) rate.

By the way, parts constituting one character often contain common parts. So long as the respective widths and lengths of the common parts are not made the same as each other, the balance of the character is damaged. For example, Chinese character "日" shown in FIG. 5 is constituted using a plurality of common parts, i.e., three horizontal parts "a" "b" and "c". When an E/R processing is carried out according to a designated E/R rate and a rounding processing is then carried out, it is impossible to output the character with a good balance so long as the respective thicknesses and lengths of the three common parts are not made the same as each other.

Now it is assumed that, as a result of computation according to a designated E/R rate, the positions, thicknesses and lengths of each part are made as shown in FIG. 5. For simplification, only the explanation as to the thicknesses is given. As shown in FIG. 5, on the coordinates, the parts "a" "b" and "c" are disposed between 2.0 and 3.2, between 5.3 and 6.5, and between 8.3 and 9.5, respectively. The thicknesses of the parts "a" "b" and "c" are all 1.2.

Figure 6:
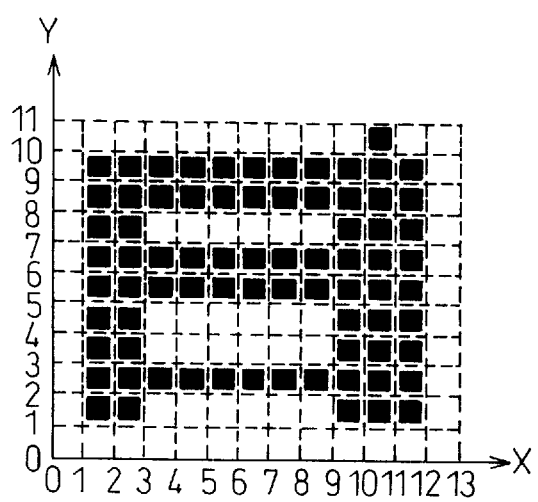
FIG. 6 is a diagram showing an example of the output character.
Figure 7A:
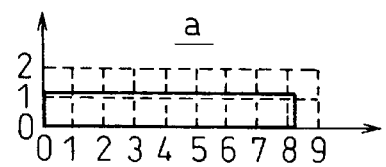
FIGS. 7a to 7e are diagrams showing coordinate systems for each part.
Figure 7B:
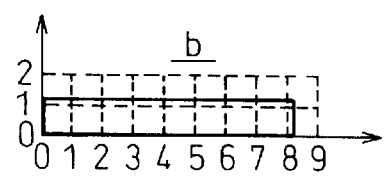
Figure 7C:
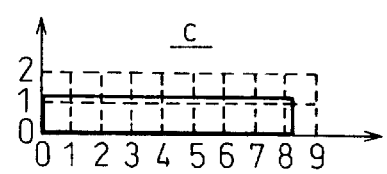
Figure 7D:
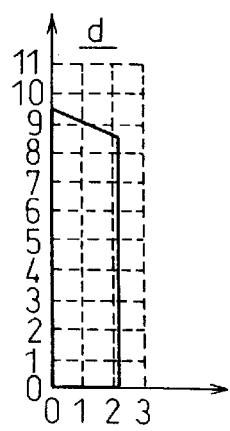
Figure 7E:
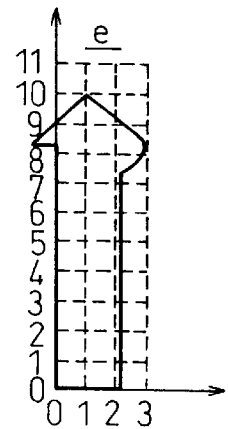

However, when a rounding processing is carried out so that each part is moved to the position at which it can be physically output, the parts "a" "b" and "c" lie between 2 and 3, between 5 and 7, and between 8 and 10, respectively, since the first decimal point is rounded off. Namely, due to the rounding processing, the thicknesses of each part which must be the same become different from each other. This also applies to the parts "d" and "e". Accordingly, when the character is output using the values (thicknesses) after the rounding processing, the balance of the output character is damaged as shown in FIG. 6.

To cope with this, the memory 13 (see FIG. 1) stores the coordinates information concerning arrangement positions of each part in the entire character, plus coordinates information peculiar to each part as shown in FIGS. 7a to 7e. By using the latter information, it is possible to output common parts with the same thickness and with the same length. Namely, by positioning the results computed according to a designated E/R rate, on the respective coordinate systems for each part, the respective thicknesses of the common parts are positioned between 0 and 1.2. When a rounding processing is carried out with respect to the positioned thicknesses, they are positioned between 0 and 1. Namely, as to the common parts, it is possible to make their thicknesses and their lengths the same as each other.

Figure 9:
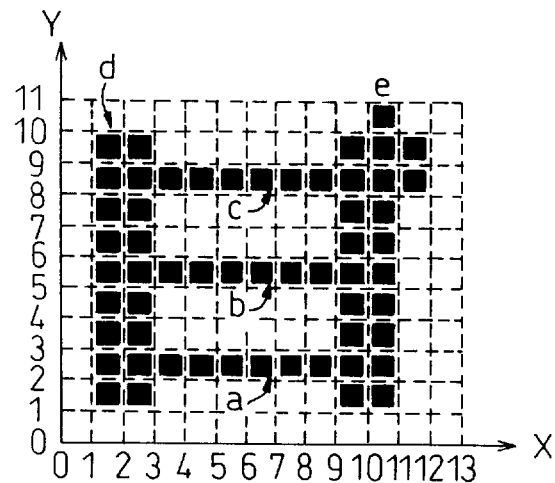
FIG. 9 is a diagram showing an example of the output character.

When each part of the character is arranged using the coordinate values shown in FIG. 8a, all of the common parts have the same thickness as shown in FIG. 9, and thus it is possible to output the character with the original balance being kept. Note, in order to arrange the respective parts on the coordinates of the character, a rounding processing is carried out with respect to the coordinates of the arrangement origins of each part and thereby the coordinate positions of the arrangement origins are obtained as shown in FIG. 8b. Thus, it is possible to carry out the E/R processing while keeping the balance of the original character.

Figure 10:
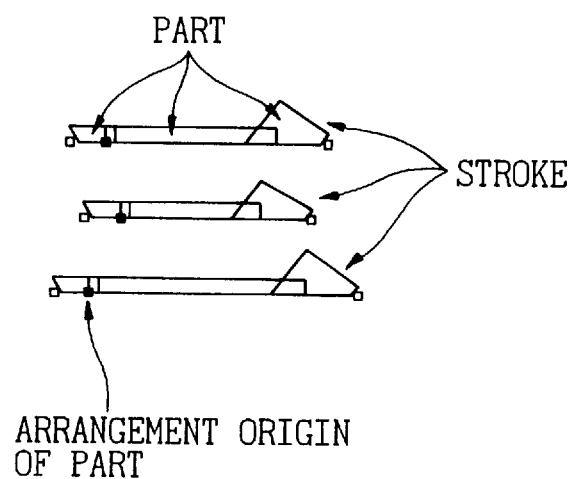
FIG. 10 is an explanatory diagram of strokes and parts constituting one character.

Also, a plurality of parts constitute one stroke and a plurality of strokes constitute one character. For example, as shown in FIG. 10, Chinese character "三" is constituted by one element constituted by three strokes or nine parts. Even when each part of the character thus constituted is arranged, it is necessary to keep the balance of the character using a rounding processing.

What correlates the arrangement origins for use in outputting each part with respective parts for each stroke is referred to as "skeleton" of a character. The form of a character is determined by a combination of each part, and each part is arranged based on its skeleton. Also, it is important to select the respective skeletons so that each stroke constituting the character is arranged with a good balance. Furthermore, when the strokes are connected to each other, it is important that an end portion of each stroke does not protrude and is in good order. On the other hand, respective outlines of the arranged parts are designs that determine the style of the character, and form a delicate beauty of the style of the character.

Accordingly, as to Japanese style of character, it is possible to create a high quality character by finely controlling both the skeleton and the outline of the character. Paying attention to the skeleton of a character, the following important factor can be found. First, a character cannot protrude from a circumscribed quadrilateral called "body" set when it is designed. If the character protruded from the "body", it would be in contact with adjacent other characters. This leads to a deterioration in the quality of the character output. In view of this, horizontal lines in the upper and lower portions are more important than a horizontal line in the central portion. Also, as to a single horizontal line, parts lying at both ends are more important than a middle part, since arrangement origins of the parts lying at both ends determine the length of the horizontal line.

Processing as to the arrangement origins of each part based on priority order of the above importances is carried out as follows. Here is described an example in which a character expressed on the master coordinates having ordinate of 1000 and abscissa of 1000 is reduced on the target coordinates having ordinate of 12 and abscissa of 12. The master coordinates are the integer coordinate system in which the original coordinates of characters are expressed, and the coordinate values are stored as style data. Also, the target coordinates are the integer coordinate system depending on the resolution of the output apparatus. One graduation of the target coordinates normally corresponds to one dot.

As to the procedure of creating Chinese character "三", FIG. 10 shows the arrangement origins of the parts lying at both ends in each stroke of the upper and lower portions.

First, computation is executed for reducing the arrangement origin of the start part, i.e., "start part origin", and the arrangement origin of the end part, i.e., "end part origin" from the master coordinate system to the target coordinate system. As to each arrangement origin, the processing for rounding off the generated decimal points is carried out. Namely, as shown in FIG. 4, each arrangement origin is moved onto the nearest grid.

By the movement, the stroke is reduced although its reduction rate from the master coordinates to the target coordinates is slight. Next, the reduction rate of the stroke is determined based on the following equation.

STROKE REDUCTION RATE =

(STROKE LENGTH AFTER MOVEMENT TO GRID)/

(STROKE LENGTH ON MASTER COORDINATES)

Figure 11:
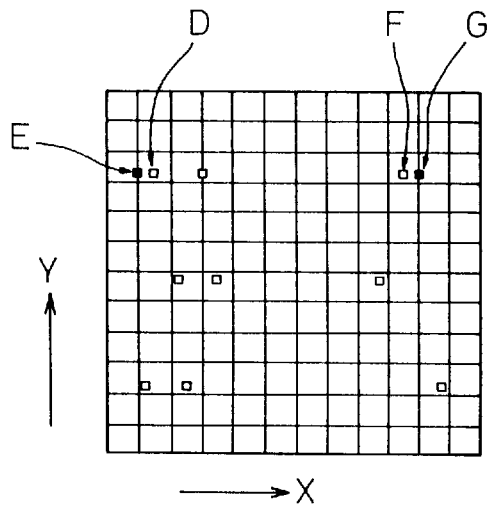
FIG. 11 is a diagram for explaining a compensation of the arrangement origins on the grid coordinates.

As shown in FIG. 11, white squares D and F indicate arrangement origins of the computed decimal point coordinates of each part, and black squares E and G indicate results obtained by moving the white squares D and F, respectively, to the nearest grid on the integer coordinates. Namely, since dots cannot be physically output at the positions of the white squares D and F, a movement is carried out to the points (positions of the black squares E and G) at which dots can be physically output.

Hereinafter, the explanation as to the X-coordinates is given.

Assuming that a start part origin, a middle part origin and an end part origin are Sx, Mx and Ex, respectively; values of these part origins on the master coordinates are SxMG, MxMG and ExMG, respectively; values after reduced are SxNTG, MxNTG and ExNTG, respectively; and values after moved to the grids on the target coordinates are SxTG, MxTG and ExTG, respectively, the following equations are obtained. Note that "round" means a rounding processing.

$SxNTG = SxMG \times (12/1000) = 123 \times 0.012 = 1.48$
$SxTG = \text{round } TG(1.48) = 1$
$ExNTG = ExMG \times (12/1000) = 793 \times 0.012 = 9.52$
$ExTG = \text{round } TG(9.52) = 10$
STROKE REDUCTION RATE $= (ExTG - SxTG)/(ExMG - SxMG)$
$= (10 - 1)/(793 - 123) = 0.0134$ As seen from these computations, the stroke reduction rate has a value slightly different from the designated reduction rate (0.012).

All of the elements of the skeleton in the stroke is reduced according to the stroke reduction rate. Since the start part and the end part are moved onto the grids, the remaining middle part origin is computed as follows. Namely, the middle part origin on the target coordinates is first moved by the same movement quantity as that of the start part origin, then regarded as being reduced according to the stroke reduction rate determined by the movement of the end part origin, and computed by the following equation.

MIDDLE PART ORIGIN ON TARGET COORDINATES =

(START PART ORIGIN ON TARGET COORDINATES) +

[(MIDDLE PART ORIGIN ON MASTER COORDINATES) −

(START PART ORIGIN ON MASTER COORDINATES)] ×

STROKE REDUCTION RATE

Using this equation, the following concrete value is obtained.

$$
\begin{aligned}
MxNTG &= SxTG + (MxMG - SxMG) \times 0.0134 \\
&= 1 + (258 - 123) \times 0.0134 = 2.81
\end{aligned}
$$

If the middle part origin is moved to the grid on the target coordinates, the stroke reduction rate would exhibit different values at both ends of the middle part.

In view of this, the middle part origin is not moved to the grid, and thus is left having its decimal point.

The above is the procedure of creating the arrangement origins of the character with a high quality. By the procedure, the skeleton of the character is positioned on the target coordinates, with a small error in the positions of the determined arrangement origins. Although the above processings are explained with respect to the X-coordinates, the like processings need to be carried out with respect to the Y-coordinates.

Next, the processing of creating outline information of the character will be explained.

The stroke reduction rate (0.0134) computed by the above processing of creating skeleton information of the character has a value slightly different from the initial reduction rate (0.012) designated for reducing the character. To coincide one reduction rate with the other, the outline constituting the stroke is reduced according to the stroke reduction rate.

First, outline points are reduced according to the stroke reduction rate, and the generated decimal points are moved by a rounding processing to other grids on the target coordinates. Here, outline points important to keep a shape of the outline very good are provided at a plurality of places on the outline. These outline points contain outline points with "hint" information indicating how to carry out a rounding processing to the target grids, and the maximum coordinate values and the minimum coordinate values in both the X-axis direction and the Y-axis direction.

Next, the processing of determining outline points will be explained in detail with reference to FIG. 12.

Figure 12:
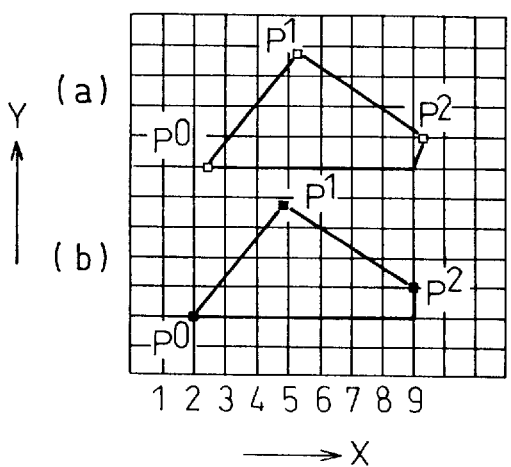
FIG. 12 is a diagram for explaining a compensation of the end part on the grid coordinates.

In FIG. 12, points p0, p1 and p2 represent coordinates constituting the outline of each part, respectively. Among them, the points p0 and p2 are marked as important coordinates relating to the quality, and such a marked point has hint information. Hereinafter, only the explanation as to the X-coordinate is given.

The X-coordinate of the point p0 is 164, and the point p0 is reduced according to the stroke reduction rate (0.0134). As a result, the reduced coordinate value becomes 2.2, and the final coordinate value becomes 2 by a rounding processing. In the same manner, the X-coordinate of the point p2 is 702, and the point p2 is reduced according to the stroke reduction rate (0.0134). As a result, the reduced coordinate value becomes 9.4, and the final coordinate value becomes 9 by the rounding processing. Next, in the same manner as the skeleton processing, a reduction rate of a hint section of the outline sectioned by the points p0 and p2 is computed as follows:

REDUCTION RATE OF HINT SECTION=(9−2)/(702−164)= 0.0130

This reduction rate is a reduction rate peculiar to the hint section, obtained by positioning the points p0 and p2 with hint information on the target coordinates. All of the outline points belonging to the hint section are reduced according to the above reduction rate. For example, the outline point p1 is moved by the same movement quantity as that of one of the outline points p0 and p2 at both ends of the hint section, and is moved on the coordinates linearly transformed according to the reduction rate of the hint section computed by the positioning of the other outline point. Namely, FINAL COORDINATE OF p1=2+(396−164)×0.0130=5.016

In the same manner as the middle part origin in the skeleton processing, all of the coordinates in the hint section are moved by a rounding processing to the grid coordinates.

The above computation is executed by the CPU 10 based on the program installed in the ROM 11.

Figure 13:
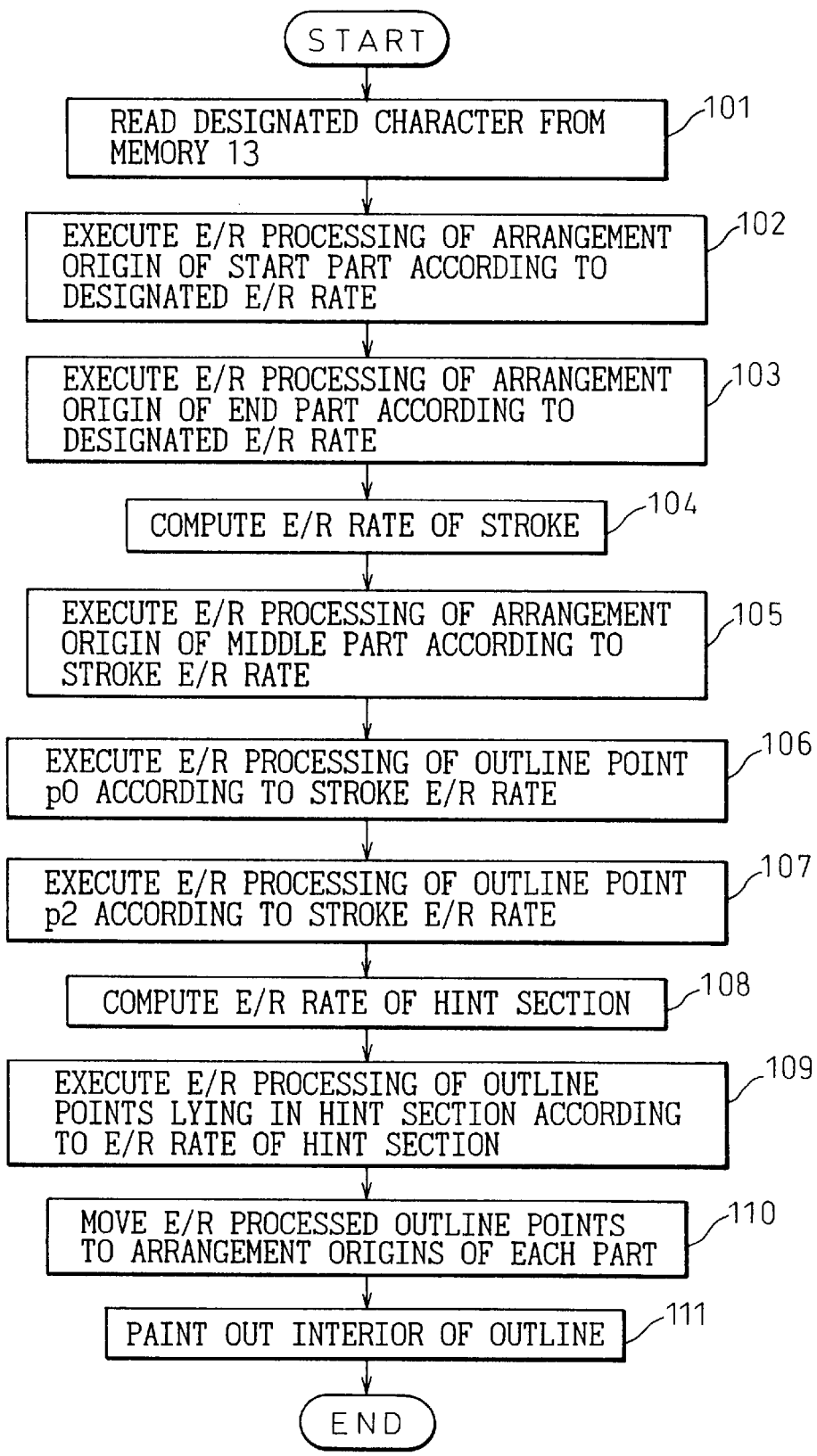
FIG. 13 is a flowchart representing the processing of compensating strokes.

FIG. 13 is a flowchart representing the processing of compensating strokes;

Next, the positioning processing including a compensation of each stroke will be explained with reference to the constitution shown in FIG. 1 and the flowchart shown in FIG. 13.

First, commands and data received via the interface 14 are stored in the RAM 12 and analyzed by the CPU 10. Then a train of coordinates of an outline of a designated character are read from the memory 13 and stored in the bit map memory 15. The bit map memory 15 develops the coordinates into a bit map image of the size of the designated character, then synthesizes the bit map image with a graphic image, and stores therein. The stored data is transmitted via the interface 16 to an output unit such as a printer or a display.

Hereinafter, the character development processing will be explained with reference to FIG. 13. First, the designated character is read from the memory 13 (step 101) and classified into outline information and skeleton information. The outline information indicates information concerning outlines expressing shapes and thicknesses of characters, and the skeleton information indicates information which correlate arrangement origins of each part with respective parts in each stroke.

Next, with respect to the arrangement origin of a start part among the arrangement origins of the skeleton information, an E/R processing is executed according to a designated E/R rate and the position is compensated to be aligned on the grid coordinates (step 102). In the same manner, with respect to the arrangement origin of an end part, an E/R processing is executed according to the designated E/R rate and the position is compensated to be aligned on the grid coordinates (step 103).

Next, with respect to a skeleton of a stroke whose both ends are two coordinate values computed at steps 102 and 103, an E/R rate is computed (step 104). With respect to the arrangement origin of a middle part, an E/R processing is executed according to the stroke E/R rate computed at step 104 (step 105).

Next, a train of coordinates constituting an outline of the character are read from the memory 13. With respect to the outline point p0 with hint information, an E/R processing is executed according to the stroke E/R rate computed at step 104 and a rounding processing is carried out according to the hint information (step 106). In the same manner, with respect to the outline point p2 with hint information, an E/R processing is executed according to the stroke E/R rate and a rounding processing is carried out according to the hint information (step 107).

Next, with respect to a hint section of an outline whose both ends are the two outline points p0 and p2, an E/R rate peculiar to the hint section is computed (step 108). With respect to outline points in the hint section, an E/R processing is executed according to the E/R rate computed at step 108 (step 109).

By repeatedly executing the processings of steps 106 to 109, positions of all of the outline points of each part are determined. Namely, the outline points of each part are determined by computing all of the points containing the outline point p1 lying between the two outline points p0 and p2 with hint information.

Next, the outline points E/R-processed at step 109 are moved to the arrangement origins of each part computed at steps 102 to 105, and thus each part is output at the respective arrangement origins (step 110). Next, the interior of the determined outline is painted out and the bit map image of the character is stored in the bit map memory 15 (step 111). After this processing, this flow comes to an end.

Hereinafter, the above explained operation will be explained in detail using Chinese character "一".

Figures 14, 15:
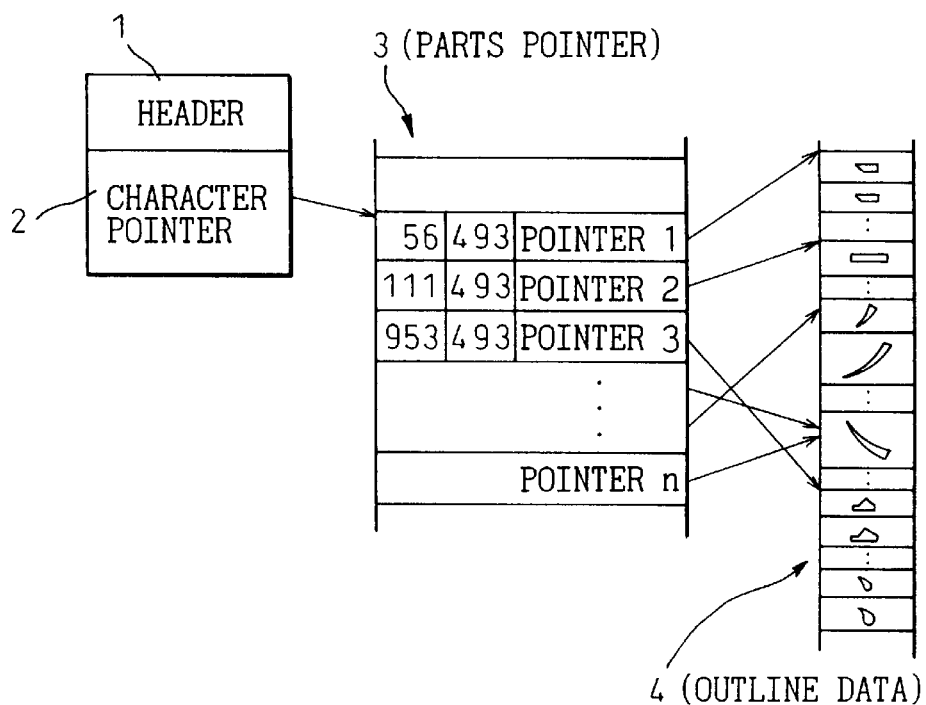
FIG. 14 is a diagram showing the constitution of the memory for storing font file.
FIG. 15 is a diagram showing the data structure of the skeleton information.

FIG. 14 shows the constitution of the memory 13 for storing font file. Reference 1 denotes a header in which information concerning fonts is stored; reference 2 a character pointer for pointing a train of parts pointers based on the character code received from the higher-rank apparatus; reference 3 a parts pointer in which coordinate values of the arrangement origins of each part and pointers to parts outline data are stored; and reference 4 an outline data unit in which outline data of each part constituting the character are stored. First, an address to the parts pointer 3 is obtained by the character pointer 2, based on the character code of the character "一". Then, the arrangement origin (56, 493) of a start part, the arrangement origin (111, 493) of a middle part and the arrangement origin (953, 493) of an end part are read from the parts pointer 3, and thus pointers to the outlines of each part are obtained.

Next, how to process skeletons of the character will be explained with reference to FIGS. 15 and 16.

The arrangement origins of each part read from the parts pointer 3 of FIG. 14 are placed as master coordinate values on a calculation table constituted in the memory.

The CPU 10 first executes an E/R processing with respect to the master coordinate values of each part according to a designated E/R rate. In this example, the E/R rate is 0.012 and the character is expressed on the coordinates of 12×12.

Since the E/R processing is carried out preferentially with respect to the respective arrangement origins of the start part and the end part, the coordinate value of the arrangement origin of the start part is (0.672, 5.916) obtained by multiplying the initial value (56, 493) by the E/R rate (0.012), and the coordinate value of the arrangement origin of the end part is (11.436, 5.916) obtained by multiplying the initial value (953, 493) by the E/R rate (0.012). It is desirable that these coordinate values are stored in the fixed decimal mode convenient to the computation speed of the CPU 10.

Next, a hint processing is carried out so that the arrangement origins of the start part and the end part are aligned to the positions at which they can be physically output. Namely, a rounding processing is carried out for rounding off the respective first decimal points of (0.672, 5.916) and (11.436, 5.916) computed according to the E/R rate. As a result, as shown in FIG. 15, the arrangement origins of the start part and the end part become (1, 6) and (11, 6), respectively. Thus, the arrangement origins of each part important to determine the quality of the skeleton of the character are compensated to the positions at which they can be physically output.

Next, an E/R rate peculiar to the stroke is computed based on the arrangement origins. This E/R rate is computed, using the X-coordinate value (56, 953) on the master coordinates and the X-coordinate value (1, 11) after the above hint processing, by the following equation.

STROKE $E/R$ RATE=$(11-1)/(953-56)=0.011$

As seen from this equation, the E/R rate peculiar to the stroke is smaller than the designated E/R rate. This is because the two arrangement origins are moved to inside the outline by the rounding processing.

The E/R rate peculiar to the stroke is used to execute an E/R processing with respect to the arrangement origin of the middle part and outline points with hint information. Namely, an E/R processing is executed according to the stroke E/R rate (0.011), with respect to the arrangement origin (111, 493) of the middle part read from the calculation table of FIG. 15. The above processing also applies to the Y-coordinate value. As a result, the coordinate values of this arrangement origin become (1.605, 6), as shown in the following equations.

MIDDLE PART ARRANGEMENT ORIGIN "$X$"=$1+(111-56)\times 0.011=1.605$

MIDDLE PART ARRANGEMENT ORIGIN "$Y$"=$6+(493-493)\times 0.011=6$.

As described before, with respect to the arrangement origin of the middle part, no hint processing is carried out, since the E/R rate exhibits different values at both ends of the middle part. Accordingly, the E/R-processed coordinate values are used as they are.

Next, the processing of creating outline information will be explained.

The train of coordinates of outlines of each part read from the memory 13 are transmitted to the calculation table shown in FIG. 16. The illustrated example shows the coordinate values concerning the end part. Namely, the master coordinates of each outline of the end part are (−92, 103), (−182, 0), (0, 0), (0, 21) and (−92, 103). Outline point numbers 2 and 4 have hint information for aligning the respective outline points in the X-axis direction to the positions at which they can be physically output. In the same manner, outline point numbers 1, 3 and 5 have hint information for aligning the respective outline points in the Y-axis direction to the positions at which they can be physically output.

First, with respect to the outline points with hint information, an E/R processing is executed according to the stroke E/R rate. This E/R processing is executed independently with respect to the X-axis direction and the Y-axis direction. With respect to the outline point 2 in the X-coordinates, an E/R processing is first executed. The coordinate value of the outline point 2 is −182 and the stroke E/R rate in the X-axis direction is 0.011, and thus the E/R-processed result is −2.002. Then, a rounding processing is carried out for aligning the outline point to a position at which it can be physically output. As a result, the coordinate value becomes −2. The subsequent outline point number with hint information is 4 and its coordinate value is 0. Accordingly, both the coordinate value after the E/R processing and the coordinate value after the hint processing are 0. Based on the processed results of the two outline points 2 and 4, an E/R rate of a hint section lying between the two outline points 2 and 4 is computed as follows:

E/R RATE OF HINT SECTION 2–4=(−2−0)/(−182−0)=0.011

The outline point 1 among the other outline points is included in the hint section 2–4, and thus an E/R processing is executed using the E/R rate (0.011) peculiar to the hint section.

"X" COORDINATE VALUE OF OUTLINE POINT 1=0+(−92−0)×0.011=−1.012

In the same manner, an E/R processing is executed with respect to the other outline points 3 and 5.

Also, the like processing as in X-axis direction is carried out with respect to Y-axis direction. By these processing, each coordinate value is obtained on the calculation table and thus the X-coordinate values and the Y-coordinate values are computed. At this time, the arrangement origins of the outlines of each part already computed, e.g., (11, 6) of the end part, are added to the respective coordinate values of each outline point.

When the respective processings concerning the outlines and the skeletons of each part of the character "三" are completed, the bit map image of the character is formed and then transmitted via the interface 16 to the output unit.

According to the above processings, it is possible to precisely carry out the positioning of each part constituting one stroke and thus to improve the quality of one stroke. Therefore, as to a character which has no connection relationship between strokes, e.g., Chinese character "三", it is possible to improve the quality of the character output.

However, where a plurality of strokes constituting one character are connected to each other, as described below, it is possible to further improve the quality of the character by compensating the position relationship between the connected strokes.

Figure 17A:
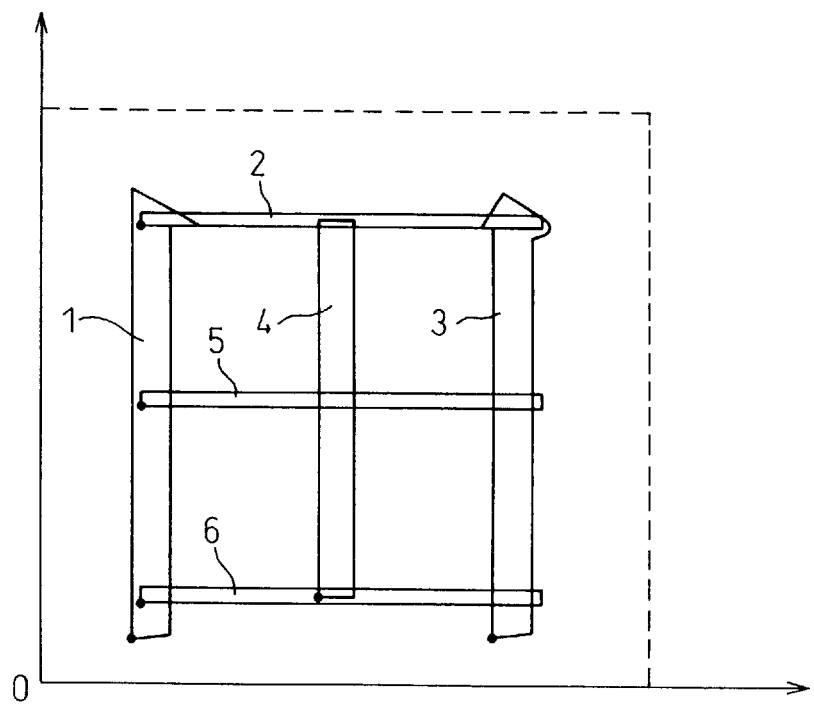
FIGS. 17a and 17b are diagrams showing the relationship between the character and strokes, and the output character, respectively.

As shown in FIG. 17a, one example is considered, where one character is constituted by a plurality of strokes and one stroke is connected another stroke. In FIG. 17a, a black circle indicates the left and bottom point of a circumscribed quadrilateral of the pattern of each part, and corresponds to the arrangement origin of each part.

Information of each part is constituted, as shown in FIG. 14, by the information of the character pointer 2, the information of the parts pointer 3, and the information of the outline data. The character pointer 2 stores pointers for pointing a head address of the region in which parts information is stored. The parts pointer 3 stores coordinate values of the arrangement origins of each part and pointers to the outline data unit 4. The outline data unit 4 stores respective outline data in the coordinate systems of each part.

When the character pattern is supplied, the origin of the stroke coordinate system is arranged on the arrangement origin of the parts pointer 3 and thus the parts are assembled to form the character. Then, a transformation of the coordinates is carried out according to an E/R rate designated by the higher-rank apparatus. At this time, the correlation between the strokes is changed by carrying out a rounding processing with respect to the coordinate values to thereby control line widths and line-to-line distances.

Figure 17B:
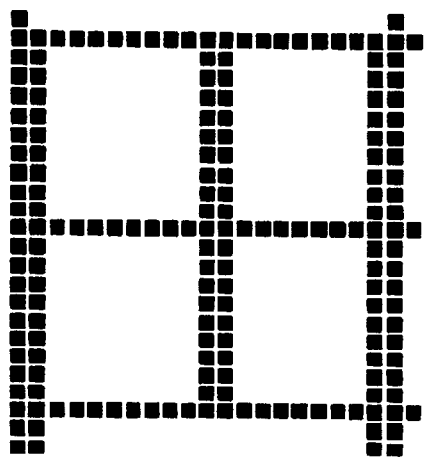

As a result, as shown in FIG. 17b, each horizontal line protrudes from the right vertical line. Namely, when the sizes of each part are computed for one stroke according to a designated E/R rate and a rounding processing is carried out on the target coordinates, there is a possibility in that the stroke E/R rate becomes greater than the designated E/R rate. In this case, the length of the stroke becomes long. As a result, in the output character, the horizontal line which must not protrude from the right vertical line protrudes therefrom.

The present invention is intended to realize a high quality character output by storing assembly information of the patterns of each part constituting the character and, based on the assembly information, assembling each part to form the character.

FIG. 18 shows an example of the common file storing such assembly information. This common file is stored in the memory 19 of FIG. 1, and stores information concerning the assembly order of strokes in the X-axis direction, information concerning the assembly order of strokes in the Y-axis direction, and junction information concerning each stroke.

The assembly order contains priority orders to carry out the positioning of the respective strokes in the X-axis direction and the Y-axis direction. For example, in the case of Chinese character "田" shown in FIG. 17a, the priority order in the X-axis direction is set to (1, 3, 4, 2, 6, 5) as shown in FIG. 18, and the priority order in the Y-axis direction is set to (2, 6, 5, 1, 3, 4).

On the other hand, the junction information contains information (sy2) indicating that a start tip of the stroke 1 (see FIG. 17a) is connected to the stroke 2 in the Y-axis direction, and information (ey6) indicating that an end tip of the stroke 1 is connected to the stroke 6 in the Y-axis direction. Also, as to the stroke 2, the junction information contains information (sx1) indicating that a start tip thereof is connected to the stroke 1 in the X-axis direction, and information (ex3) indicating that an end tip thereof is connected to the stroke 3 in the X-axis direction. Namely, since positions in the Y-axis direction are important to determine the quality of the character output, the positioning of the horizontal lines 2 and 6 is preferentially carried out. Subsequently, the positioning of the vertical lines 1, 4 and 3 is carried out.

Next, the processing of compensating positions of each stroke will be explained with reference to the flowchart of FIG. 19.

First, the CPU 10 receives character data from the higher-rank apparatus via the interface 14, and reads information corresponding to the character data from the memories 13 and 19 (steps 201, 202).

As described above, the memory 13 stores the character pattern data peculiar to respective characters for each part, and the memory 19 stores the junction information and the assembly order information.

Here, the common file stored in the memory 19 will be explained in detail with reference to FIGS. 20a to 20c. FIG. 20a shows the entire structure of the common file; FIG. 20b shows the structure of the assembly order information; and FIG. 20c shows the structure of the junction information.

As shown in FIG. 20a, the common file includes a character pointer T1, an element pointer T2 and an element block T3. This element block T3 includes a stroke block T4 which includes a parts block T5. The stroke block T4 stores stroke classification codes, parts blocks, and the like, and the parts block T5 stores information concerning common positions of parts.

Hereinafter, the common file will be explained using Chinese character "田".

Among the data received from the higher-rank apparatus via the interface 14, a code indicating a character is analyzed by the CPU 10. For example, where the character code is "4544", an access is made to the memory region storing "4544" in the character pointer T1 and then an access is made to the element pointer T2. In the Chinese character "田", the number of elements is one, and thus the access is made to one pointer (e1e1) of the element pointer T2. If the number of elements is two, an access is made to two pointers of the element pointer T2. Then, based on the information stored in the element pointer T2, an access is made to the element block T3, and an element classification code, e.g., "10 0000 0001", is read from stroke block T4.

Also, as shown in FIG. 20b, as to the assembly order information, the higher-rank byte indicates the order in the X-axis direction and the lower-rank byte indicates the order in the Y-axis direction.

Also, as shown in FIG. 20c, the junction information contains a junction table. This junction table defines junction information (Sx, Ex, Sy, By) indicating that the start tip or the end tip of one stroke is connected to another stroke in the X-axis direction or in the Y-axis direction. Namely, Sx indicates that the start tip of one stroke is connected to another stroke in the X-axis direction; Ex indicates that the end tip of one stroke is connected to another stroke in the X-axis direction; Sy indicates that the start tip of one stroke is connected to another stroke in the Y-axis direction; and Ey indicates that the end tip of one stroke is connected to another stroke in the Y-axis direction. Presence of connection relationship between strokes is defined by setting flags to Sx, Ex, Sy and Ey.

Figure 19:
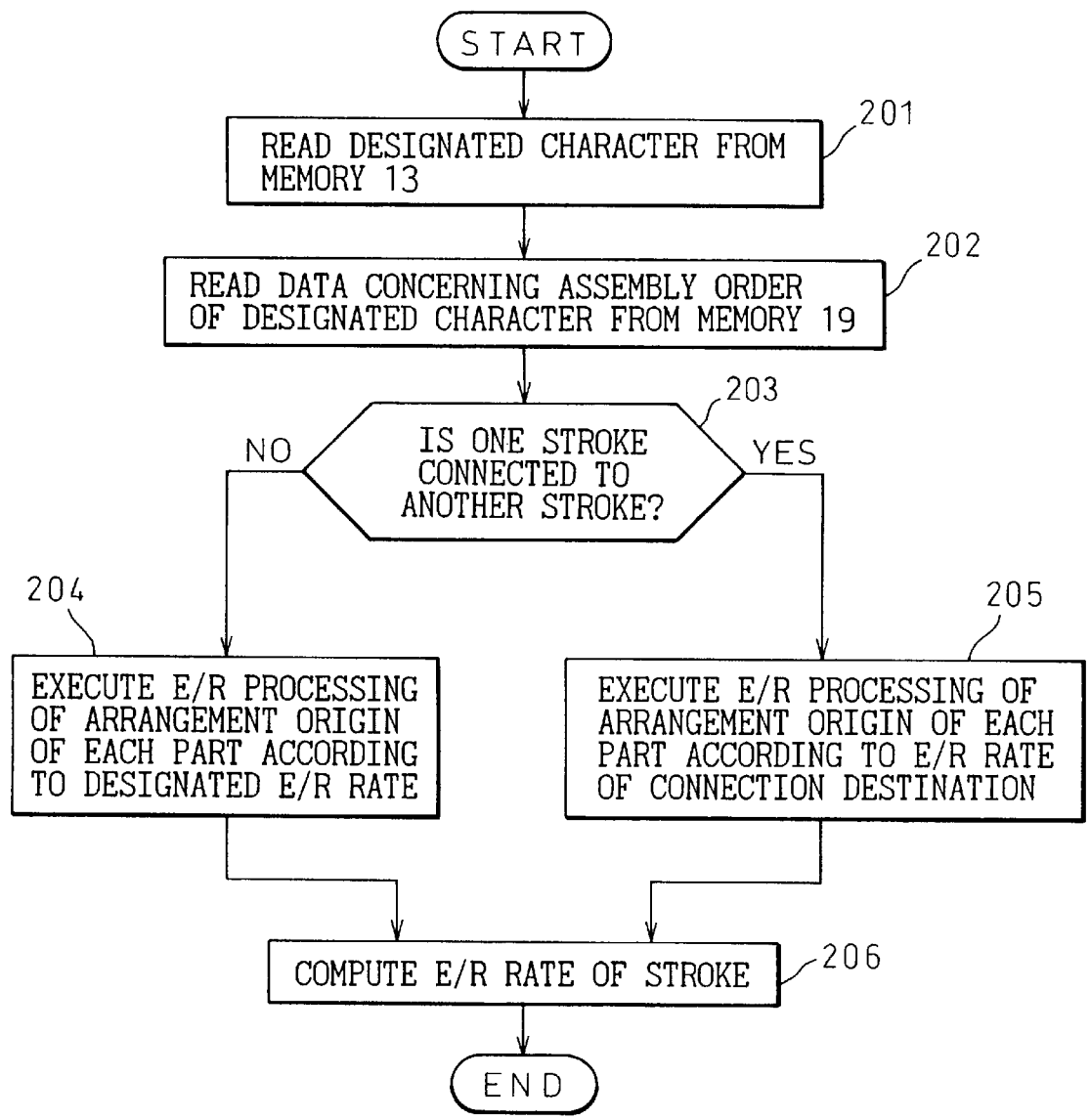
FIG. 19 is a flowchart representing the processing of compensating positions of each stroke.

Referring back to the flowchart of FIG. 19, a judgement of whether one stroke is connected to another stroke (YES) or not (NO) is made based on the junction information read from the memory 19 (step 203).

If a result of the judgement indicates NO, an E/R processing is executed with respect to the arrangement origins of each part according to the designated E/R rate and the information read from the memory 13 (step 204). If a result of the judgement indicates YES, an E/R processing is executed with respect to the arrangement origins of each part according to the corresponding junction information and the information read from the memory 13 (step 205).

After the processing of step 204 or 205, the control computes an E/R rate of the stroke (step 206). After this processing, this flow comes to an end.

Hereinafter, the compensation of the positions of strokes will be explained in detail with reference to FIGS. 21a to 21c and FIG. 22.

First, the assembly order information and the junction information are read from the memory 19. Then, the data concerning the outline of the character is read from the memory 13.

Figure 21A:
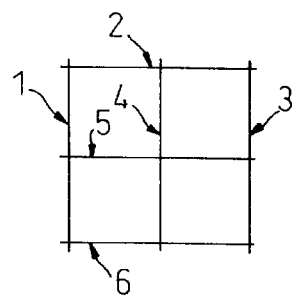
FIGS. 21a to 21c are diagrams for explaining a compensation of the positions of strokes.
Figure 21B:
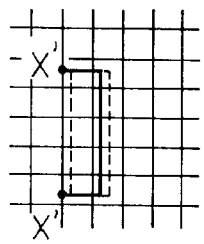
Figure 21C:
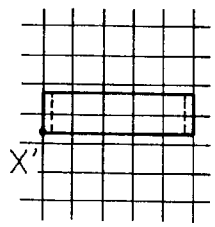

Next, with respect to the stroke 1 (see FIG. 21a), an assembly is made in the X-axis direction and its position is aligned to the grid on the target coordinates (see FIG. 21b).

A concrete calculation is carried out using the coordinate values stored in the table shown in FIG. 22, as described below. Note that, in FIG. 22, "*" is conveniently used as the symbol of a multiplication.

Also, in the following equations, x (x1, x2, x3) indicates the original coordinates of the outlines of characters stored in the font file; x' (x'1, x'2, x'3) indicates the integer coordinates on the grids; S indicates the E/R rate of the character; and "round" indicates a rounding processing.

$$x'1 = \text{round}(x1 \times S) = \text{round}(310 \times 0.04)$$
$$= \text{roundZ}(12.4) = 12$$

Next, an error caused by the above alignment (i.e., compensation quantity "a") is preserved.

$$a = x'1 - x1 \times S = 12 - 12.4 = -0.4$$

Next, in the same manner, the position of the stroke 3 (see FIG. 21a) is aligned to the grid, and compensation quantity "b" is preserved.

$$x'3 = \text{round}(x3 \times S)$$
$$b = x'3 - x3 \times S = 31 - 30.8 = 0.2$$

Next, in the same manner, the position of the stroke 4 (see FIG. 21a) is aligned to the grid. At this time, the processing of controlling line-to-line distances (e.g., distance between the strokes 4 and 1) may be carried out.

Next, in the same manner, the position of the stroke 2 (see FIG. 21a) is aligned to the grid. At this time, Sx and Ex of the stroke 2 have junction information for the stroke 1 and the stroke 3, respectively, and thus the compensation quantity "a" of the stroke 1 and the compensation quantity "b" of the stroke 3 are added to the grid coordinate of the stroke 2 (see FIG. 21c).

$$x'2S = \text{round}(x1 \times S + a) = \text{round}(260 \times 0.04 + 0.2)$$
$$= \text{round}(10.6) = 11$$
$$x'2E = \text{round}(x3 \times S + b) = \text{round}(720 \times 0.04 + 0.2)$$
$$= \text{round}(29) = 29$$

Next, in the same manner, the positions of the strokes 5 and 6 (see FIG. 21a) are aligned to the grids, respectively.

Finally, in the same manner as the above processings, the alignment processings are carried out with respect to the Y-axis direction.

FIG. 22 shows the table used when the above processings are carried out with respect to all of the strokes constituting Chinese character "田". In the table, each value has the following meaning.

Each of Sx, Sy, Ex and Ey indicates an arrangement origin of the start tip or the end tip of each stroke, and is a value in the case where one character is expressed on the coordinates of 1000×1000.

Each of JSx, JSy, JEx and JEy indicates for which stroke it has junction information. For example, as to the stroke 1, the start tip has junction information for the stroke 2 in the Y-axis direction and the end tip has junction information for the stroke 6 in the Y-axis direction.

Each of Sx*s, Sy*s, Ex*s and Ey*s indicates the arrangement origin value multiplied by the E/R rate (s), where "s" is equal to 0.04.

Each of r(Sx*s), r(Sy*s), r(Ex*s) and r(Ey*s) indicates a value obtained by rounding off the above corresponding value.

Each of ax and ay indicates a compensation value of junction information, which is obtained by subtracting the value before the rounding processing from the value after the rounding processing.

Each of Sx*s+ax, Sy*s+ay, Ex*s+ax and Ey*s+ay indicates a value obtained by adding a compensation value of the connection destination stroke to the value after the E/R processing.

Each of r(Sx*s+ax), r(Sy*s+ay), r(Ex*s+ax) and r(Ey*s+ay) indicates a value obtained by rounding off the above corresponding value.

Each of Sx', Sy', Ex' and Ey' indicates a final value in the physical coordinates of the output apparatus.

According to the above explained processings, it is possible to obtain the following advantages.

First, by adding the junction information in the outline font using a divisional system, it is possible to keep the position relationship between the patterns of each part and thus to realize an assembly of the character with a high quality.

Also, by adding the assembly order information, it is possible to efficiently carry out an assembly of the character according to the control of the patterns of each part.

Furthermore, by providing the assembly order information and the junction information independently of the font file, it is possible to remove a memory for management information possessed by the font file. Accordingly, it is possible to reduce the memory volume of the entire output apparatus and thus to improve the performance.

In the above processing technique, it is possible to determine the respective positions of a plurality of strokes constituting one character. However, in view of that each stroke is constituted by a plurality of parts (for example, start part, middle part and end part shown in FIG. 10), it is important to keep the size of each part and the position relationship between the plurality of parts.

Each part is different from another for the style in writing. For example, where a character is output in Ming-style as shown in FIG. 10, the start part with its left end obliquely slanted, and the end part having the shape of a triangle which is partly lacking, are disposed at both sides of the middle part having the shape of a rectangle.

As a result of the E/R processing according to a designated E/R rate, there is a possibility in that the relative balance between the respective sizes of the middle part and the end part is damaged and thus the balance of the entire character is damaged. This is due to an error which occurs in the above rounding processing. When the rounding processing is carried out, some parts are created with a so-called "scale" (the shape of a triangle which is partly lacking), or without such a scale, depending on the designated E/R rate.

Hereinafter, the rounding processing will be explained with reference to FIGS. 23 to 25.

Figure 23:
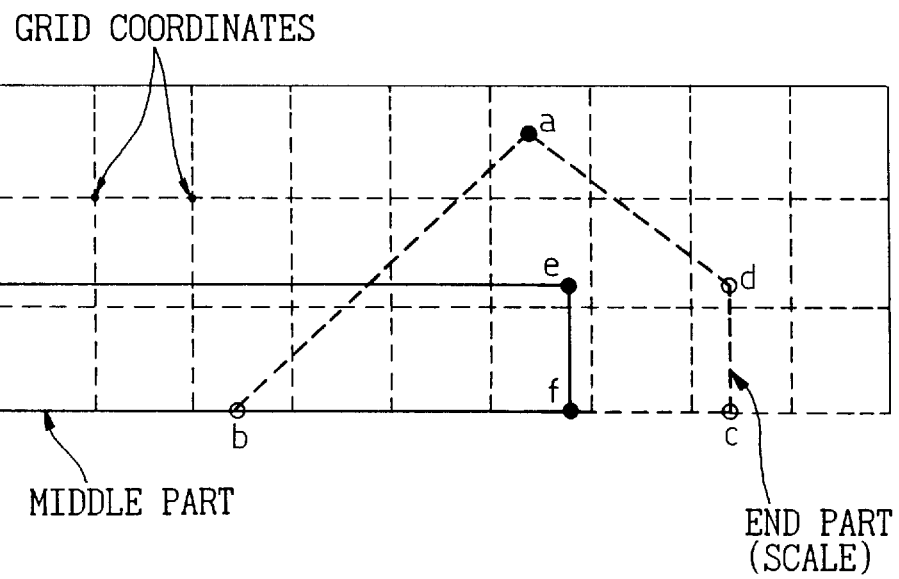
FIG. 23 is a diagram for explaining a computation of the middle part and the end part.
Figure 24:
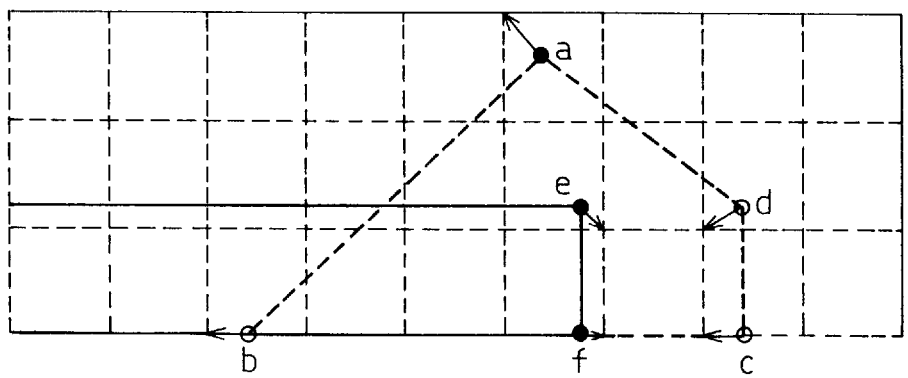
FIG. 24 is a diagram for explaining a compensation of the middle part and the end part on the grid coordinates.
Figure 25:
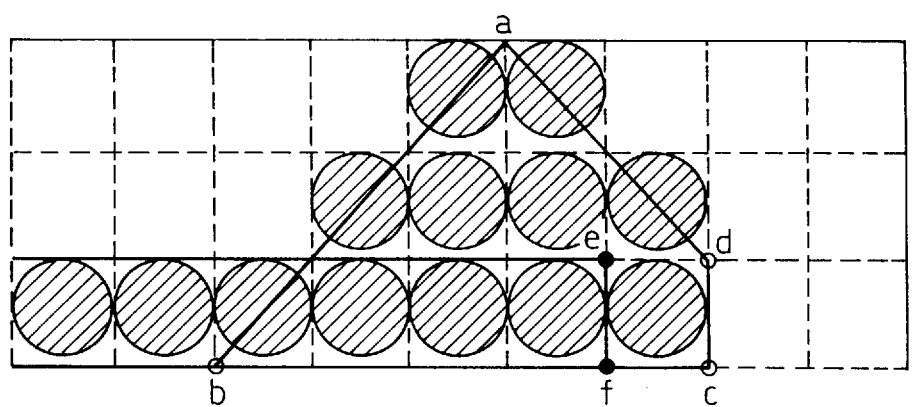
FIG. 25 is an explanatory diagram of the output of dots.
Figure 26:
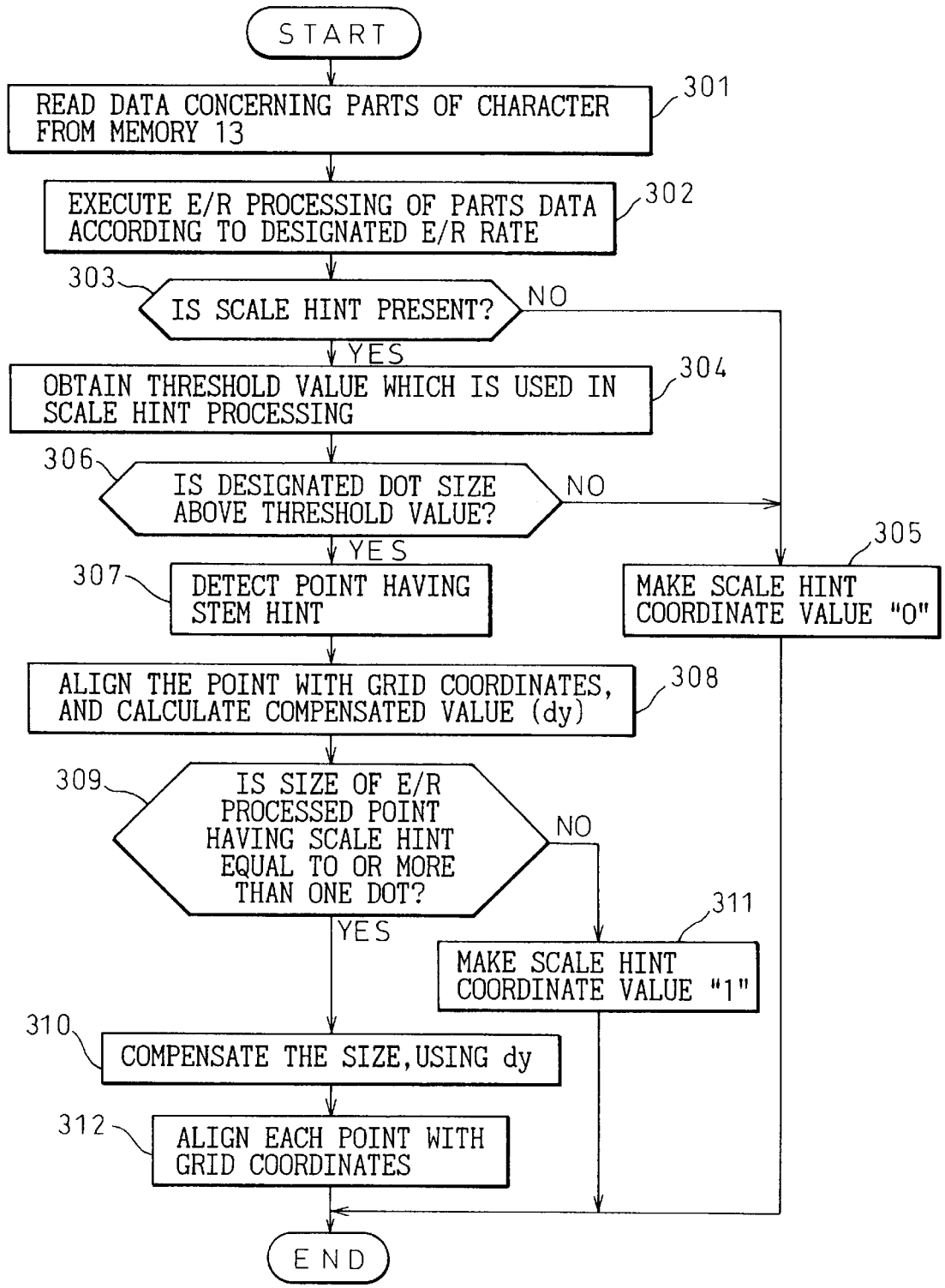
FIG. 26 is a flowchart representing the scale hint processing.

FIGS. 23 to 25 illustrate part of the output character in Ming-style, i.e., part of the right side of the middle part, and the end part which is a scale.

First, the size of the character is computed based on an E/R rate designated by the higher-rank apparatus and information concerning each part of the character read from the memory 13. As a result, as shown in FIG. 23, positions of the outline points "e" and "f" of the middle part are computed and positions of the outline points "a", "b", "c" and "d" of the end part are computed.

Next, based on the processing explained in connection with FIG. 13, the arrangement origins and the outlines of each part are determined. At the determined positions, dots are output as shown in FIG. 25.

Next, as shown in FIG. 24, the determined positions are compensated to be moved to the nearest grid positions. In this example, the points "d" and "e" are moved in the direction in which each part is made thin, and the point "a" is moved in the direction in which each part is made thick.

As a result, since the middle part is made thin and the end part is made thick, the width (referred to as "stem") of one stroke is made thin and thus the scale portion becomes large. Accordingly, the balance of the entire character is damaged. This is particularly marked when the character is reduced.

Hereinafter, the processing of balancing each part will be explained with reference to FIGS. 26 to 29.

When character data and data indicating a designated E/R rate are received from the higher-rank apparatus via the interface 14, the CPU 10 reads data concerning parts corresponding to the character data from the memory 13 (step 301).

Next, an E/R processing is executed with respect to the read parts data according to the designated E/R rate (step 302). Next, a judgement of whether a scale hint is present or not is made (step 303). Note, the scale hint is information indicating that it is an important point for outputting the scale with a good balance.

If the scale hint is present, a threshold value to be used in the scale hint processing is set (step 304). This threshold value corresponds to a predetermined number of dots.

If the scale hint is not present, the coordinate value of the scale hint is made "0" and thus no scale hint processing is carried out (step 305). In this case, the height of the scale is made the same as that of the stem (i.e., the width of one stroke).

Next, a judgement of whether the designated dot size is above the threshold value (YES) or not (NO) is made (step 306). If a result of the judgement indicates NO, the processing of step 305 is carried out. If a result of the judgement indicates YES, the scale hint processing is carried out. At this time, a point having a stem hint in the stroke possessing the part with the scale hint is detected (step 307).

Figure 27:
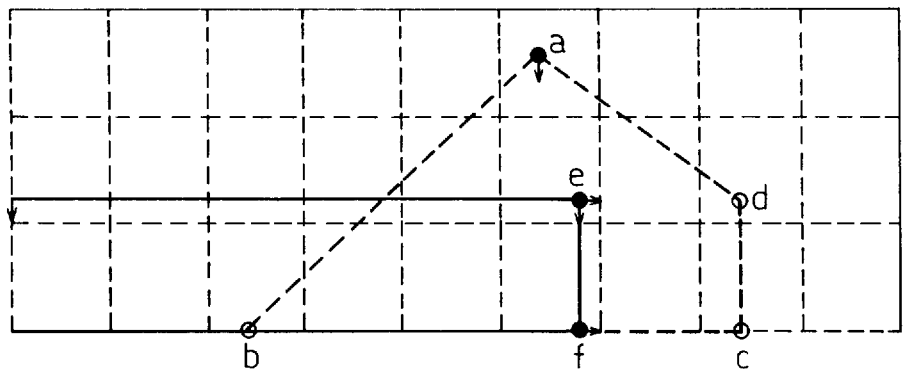
FIG. 27 is a diagram for explaining a computation of the middle part and the end part.
Figure 28:
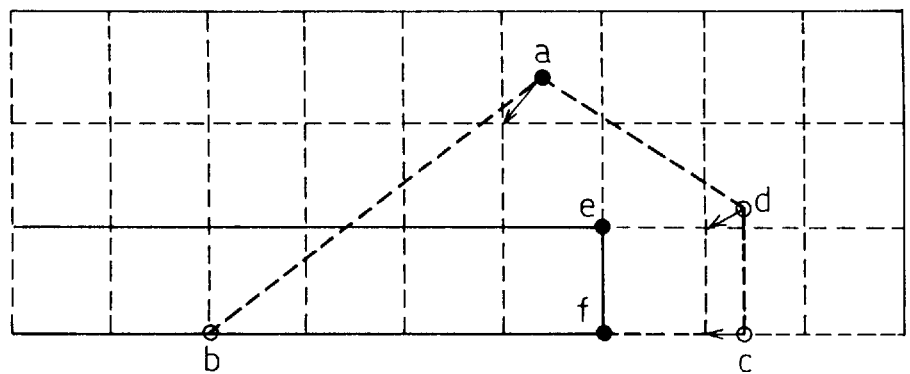
FIG. 28 is a diagram for explaining the scale hint processing of the middle part and the end part.
Figure 29:
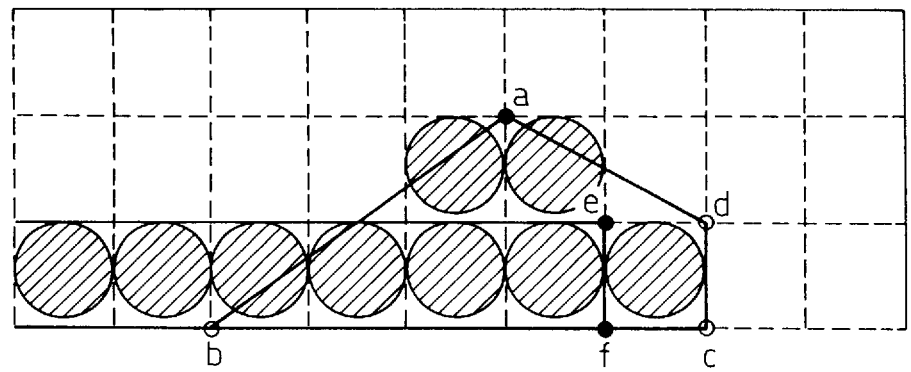
FIG. 29 is an explanatory diagram of the output of dots after the scale hint processing.

Next, the processing of aligning the point having the stem hint with the grid coordinates is carried out, and thus a compensation value (dy) of the width of the stem is calculated (step 308). Namely, as shown in FIG. 27, the outline points "e" and "f" of the middle part are compensated to be moved to the nearest grid positions. Then, using the calculated compensation value dy, the position of the outline point "a" of the end part is compensated.

Next, a judgement of whether the size of the E/R-processed point with scale hint is equal to or more than one dot (YES) or not (NO) is made (step 309). If a result of the judgement indicates YES, the size of the E/R-processed point is compensated using the above compensation value dy (step 310). If a result of the judgement indicates NO, the coordinate value of the scale hint is made "1" and thus the scale hint processing can be selectively carried out (step 311).

After the processing of step 310, the processing of aligning each point with the grid coordinates is carried out (step 312). Namely, each point is compensated to be moved to the position at which it can be physically output.

After the processing of step 305, 311 or 312, this flow comes to an end.

Additionally, in the case of an electrophotographic printer, one dot which can be physically output corresponds to a diameter of a laser beam used for forming a latent image on a photosensitive drum, or to a diameter of a laser beam which a light emitting diode (LED) can output. Also, in the case of a CRT display, one dot which can be physically output corresponds to each dot on the screen.

What is claimed is:

1. A method of processing an output form of a character when outputting the character in a visible state, comprising:

a first step of combining a plurality of parts so as to form one character;

a second step of outputting the formed character in a designated size; and said second step including a substep of determining positions of at least two points which are the basis of the positioning of each part, and a substep of determining an outline of said character based on the determined positions.

2. The method as set forth in claim 1, wherein said first step includes a substep of combining a plurality of parts to form one stroke, and a substep of combining the formed stroke in plural number so as to form one character.

3. The method as set forth in claim 2, wherein said second step includes a substep of determining positions of two points in each stroke, and a substep of determining positions of each part based on the determined positions of the two points.

4. The method as set forth in claim 3, wherein said second step isaid two points lie in the outermost side of a corresponding stroke.

5. The method as set forth in claim 2, wherein said first step further includes a substep of forming each part by a plurality of minimal elements, each minimal element being able to be physically output.

6. The method as set forth in claim 5, wherein said second step includes a substep of compensating each stroke based on a position at which said minimal element can be output; a substep of computing an enlargement/reduction rate of the compensated stroke; and a substep of computing sizes of respective parts constituting each stroke, according to the computed enlargement/reduction rate.

7. The method as set forth in claim 6, wherein said second step further includes a substep of positioning two points in each of outlines of respective parts constituting each stroke, and a substep of determining a position of an outline lying between the two points based on the compensated amount of the two positioned points.

8. The method as set forth in claim 4, wherein said second step includes a substep of compensating arrangement origins of two outermost parts among a plurality of parts constituting each stroke, based on a position at which said minimal element can be output; a substep of computing a compensated enlargement/reduction rate of each stroke, based on the compensated arrangement origins; and a substep of computing sizes of respective parts constituting each stroke, according to the computed enlargement/reduction rate.

9. The method as set forth in claim 5, wherein said plurality of parts include a basic part and a modifying part for modifying the basic part.

10. The method as set forth in claim 9, wherein said second step includes a substep of determining positions at which minimal elements constituting said basic part can be physically output; and a substep of determining a position of said modifying part based on the determined positions.

11. The method as set forth in claim 10, wherein where the size of said modifying part is smaller than that of said minimal element, said second step further includes a substep of forming the modifying part by the minimal element.

12. The method as set forth in claim 9, wherein said second step includes a substep of computing a position of said basic part based on positions at which said minimal elements can be physically output; a substep of computing a position of said modifying part based on the computed position of said basic part; and a substep of determining positions of minimal elements which are necessary for outputting said basic part and can be physically output.

13. The method as set forth in claim 12, wherein where the size of said modifying part is smaller than that of said minimal element, said second step further includes a substep of forming the modifying part by the minimal element.

14. The method as set forth in claim 2, wherein said second step includes a substep of determining positions of each stroke based on a position relationship between the stroke and an other stroke connected to the stroke.

15. The method as set forth in claim 14, wherein where a plurality of said other stroke are present, said second step includes a substep of positioning each of the plurality of other strokes in its elongated direction.

16. An apparatus for processing an output form of a character when outputting the character in a visible state, comprising:

means for storing a plurality of parts necessary for constituting one character;

means for outputting characters;

means for designating a size of each character;

processing means for combining some of the plurality of parts stored in said storing means, according to the size designated by said designating means, and outputting the combined parts as a character data to said outputting means; and said processing means including means for determining positions of at least two points which are the basis of the positioning of each part, and means for determining positions of each part based on the determined positions.

17. The apparatus as set forth in claim 16, wherein said storing means stores data concerning a plurality of strokes constituting one character, and data concerning a plurality of parts constituting each stroke.

18. The apparatus as set forth in claim 17, wherein said processing means includes means for determining two points which are the basis of the positioning of two outermost parts among a plurality of parts constituting each stroke, and means for determining positions of each part based on the determined positions of the two points.

19. The apparatus as set forth in claim 18, wherein said storing means stores relationship information defining a position relationship between a plurality of parts necessary for constituting one character.

20. The apparatus as set forth in claim 19, wherein said processing means includes means for determining positions of each part based on the relationship information stored in said storing means.

21. The apparatus as set forth in claim 18, wherein said storing means stores relationship information defining a connection position relationship between a plurality of strokes necessary for constituting one character.

22. The apparatus as set forth in claim 21, wherein said processing means includes means for determining a compensated amount of position of each stroke in its elongated direction based on the relationship information stored in said storing means.

23. The apparatus as set forth in claim 17, wherein said outputting means includes means for forming a character by a plurality of minimal elements when outputting the character, and the plurality of parts stored in said storing means include a basic part and a modifying part for modifying the basic part.

24. The apparatus as set forth in claim 23, wherein said processing means includes means for determining a position of said basic part constituting each stroke, and means for determining a position of said modifying part in each stroke based on the determined position of said basic part.

25. The apparatus as set forth in claim 24, wherein each of said plurality of minimal elements is a dot which can be physically output.

26. The apparatus as set forth in claim 23, wherein said processing means includes means for computing a position of said basic part based on positions at which said minimal elements can be physically output; means for computing a position of said modifying part based on the computed position of said basic part; and means for determining positions of minimal elements which are necessary for outputting said basic part and can be physically output.

27. A storage media storing a program for processing an output form of a character when outputting the character in a visible state, comprising:

- a first step of combining a plurality of parts so as to form one character;
- a second step of outputting the formed character in a designated size; and
- said second step including a substep of determining positions of at least two points which are the basis of the positioning of each part, and a substep of determining an outline of said character based on the determined positions.

* * * * *